(12) United States Patent
Madsen et al.

(10) Patent No.: US 11,530,689 B2
(45) Date of Patent: Dec. 20, 2022

(54) DISPENSING STATION AND A DISPENSING SYSTEM

(71) Applicant: Hove A/S, Glostrup (DK)

(72) Inventors: Ivan Madsen, Odense Sv (DK); Thomas Cramer, Glostrup (DK)

(73) Assignee: HOVE A/S, Glostrup (DK)

( * ) Notice: Subject to any disclaimer, the term of this patent is extended or adjusted under 35 U.S.C. 154(b) by 789 days.

(21) Appl. No.: 16/463,141

(22) PCT Filed: Nov. 15, 2017

(86) PCT No.: PCT/EP2017/079319
§ 371 (c)(1),
(2) Date: May 22, 2019

(87) PCT Pub. No.: WO2018/095780
PCT Pub. Date: May 31, 2018

(65) Prior Publication Data
US 2020/0063719 A1   Feb. 27, 2020

(30) Foreign Application Priority Data

Nov. 25, 2016   (EP) ..................... 16200774

(51) Int. Cl.
| | |
|---|---|
| *F03D 80/70* | (2016.01) |
| *F03D 17/00* | (2016.01) |
| *H04W 4/80* | (2018.01) |
| *F16N 11/08* | (2006.01) |
| *F16N 29/02* | (2006.01) |
| *G05D 7/06* | (2006.01) |

(52) U.S. Cl.
CPC ............. *F03D 80/70* (2016.05); *F03D 17/00* (2016.05); *F16N 11/08* (2013.01); *F16N 29/02* (2013.01); *G05D 7/0676* (2013.01); *H04W 4/80* (2018.02); *F05B 2260/98* (2013.01)

(58) Field of Classification Search
CPC .......... F03D 80/70; F03D 17/00; H04W 4/80; F16N 11/08; F16N 29/02; G05D 7/0676; F05B 2260/98
See application file for complete search history.

(56) References Cited

U.S. PATENT DOCUMENTS 4,994,984 A * 2/1991 Massimo ............... B67D 7/303
                                                        700/282
6,341,629 B1 * 1/2002 Clark ................. G01N 33/2829
                                                         141/59
(Continued)

FOREIGN PATENT DOCUMENTS

| CN | 2879546 Y | 3/2007 |
| CN | 105329192 A | 2/2016 |
| WO | 2013029164 A1 | 3/2013 |

*Primary Examiner* — Michael A Riegelman
(74) *Attorney, Agent, or Firm* — Dinsmore & Shohl LLP (57) ABSTRACT

The present disclosure relates to a dispensing station comprising a data processing unit configured for communicating with a controller and configured for receiving one or more command parameter(s) via a first communication device, the first communication device is a wireless device. The dispensing station is configured for receiving a first set of condition parameters via the first communication device, wherein the first condition parameters is related to at least the container.

15 Claims, 1 Drawing Sheet

(56) References Cited

U.S. PATENT DOCUMENTS

| | | | | |
|---|---|---|---|---|
| 7,689,371 | B2* | 3/2010 | Memmott | G07F 15/06 |
| | | | | 702/55 |
| 8,485,233 | B2* | 7/2013 | Allinson | B67D 7/348 |
| | | | | 141/105 |
| 9,813,000 | B2* | 11/2017 | Jabusch | F04D 15/0066 |
| 10,787,358 | B2* | 9/2020 | Dudley | B67D 7/348 |
| 2004/0112917 | A1* | 6/2004 | Groesbeck | B67D 1/1243 |
| | | | | 222/105 |
| 2010/0321030 | A1* | 12/2010 | Gale | F04D 15/0088 |
| | | | | 903/902 |
| 2012/0134847 | A1* | 5/2012 | Conley | F16N 29/02 |
| | | | | 417/15 |
| 2012/0245729 | A1* | 9/2012 | Wegelin | G01F 15/068 |
| | | | | 700/231 |
| 2014/0129038 | A1* | 5/2014 | Finnell | G05D 7/0629 |
| | | | | 700/282 |
| 2014/0238742 | A1* | 8/2014 | Borek | F16N 29/02 |
| | | | | 175/227 |
| 2016/0186740 | A1* | 6/2016 | Klaphake | F16N 37/00 |
| | | | | 417/45 |
| 2016/0208983 | A1* | 7/2016 | Moilanen | F16N 29/00 |
| 2017/0051872 | A1* | 2/2017 | Busch | F16N 19/00 |
| 2019/0024547 | A1* | 1/2019 | Gustafson | F16N 29/02 |
| 2019/0257360 | A1* | 8/2019 | Meenakshisundaram | |
| | | | | F16C 33/6674 |
| 2019/0263341 | A1* | 8/2019 | Gustafson | F01M 1/02 |
| 2020/0032956 | A1* | 1/2020 | Reed | G05B 19/05 |
| 2020/0063719 | A1* | 2/2020 | Madsen | F03D 17/00 |
| 2020/0309319 | A1* | 10/2020 | Pitcher | F16N 7/38 |
| 2020/0347990 | A1* | 11/2020 | McKim | F16N 25/00 |

* cited by examiner

DISPENSING STATION AND A DISPENSING SYSTEM

CROSS-REFERENCE TO RELATED APPLICATIONS

This application is the U.S. national stage of PCT/EP2017/079319 filed Nov. 15, 2017, which claims priority of European Patent Application 16200774.4 filed Nov. 25, 2016 of which is hereby incorporated by reference in its entirety.

FIELD OF INVENTION

The present invention relates to a dispensing station and a dispensing system. More specifically, the present invention relates to the field of dispensing lubricant to a target, such as for example a machine or a part thereof. The machine or parts thereof may be in wind turbines.

BACKGROUND OF INVENTION

Machines cannot work properly without lubricant. If machines or parts thereof do not get lubricant, they dry out, and in worst case, get destroyed. Thus, machines must be frequently lubricated, typically using lubricators. Various lubricators are known in the field of lubrication. Some are stationary and some are mobile. Some are automatic while others are semi-automatic. The mobile solutions tend to be completely non-automatic.

Automatic or semi-automatic solutions can be defined in many ways. Some lubricators may have sensors that are coupled to machines, such that they for example can sense that the machine requires lubricant. Other lubricators may have sensor(s) that are coupled to a container, such that they can sense that the lubricant is low in content, or that the container has been used before.

Regardless of the solution, the sensor(s) of known lubricators are coupled to a closed circuit, whereby the sensor is able to determine whether an operation-condition is met or not. For example, an automatic lubricator may for example have a temperature sensor in the container, whereby it measures the temperature of the lubricant, and if the temperature is greater than a pre-defined threshold in the sensor, the lubricator is allowed to dispense the lubricant.

Many scenarios of sensors and operations based on sensor input/output are widely known in the field of lubrication.

A problem with lubricators based on sensors is that the operation conditions are pre-defined, typically from a factory setting, for example to match a specific working condition.

The predefined settings, and thus the pre-defined operation conditions may sometime not match with desired working conditions. Accordingly, it may be desired that pre-defined operation conditions in sensors or the like, are changed to comply with specific jobs, machines or lubricants.

Possible solutions are to re-define the pre-defined operation conditions in the sensors, for example, at factory level. Oher solutions are to re-define the pre-defined operation conditions in the sensor at user level. This may be sometimes be possible using technical knowledge of the sensor, and sometimes impossible.

In most automatic or semi-automatic lubricators, a data processing unit is usually coupled to the sensor(s). These sensors typically also have a memory, either coupled to the data processing unit or the sensor. The memory might be accessible through software, however typically at factory level in order to avoid safety issues and non-proper working conditions.

As presented, tampering with sensors in lubricators, in particular with their pre-defined operation conditions is typically not easy. As also described, easy access to sensor condition(s) is mostly prohibited to avoid safety issues.

SUMMARY OF INVENTION

As described above, there is a need for a lubricator, in particular semi-automatic or automatic lubricators, where conditions of one or more parts of a lubricator are easily defined or re-defined in such a way that it does not compromise safety. The present invention provides such a lubricator.

First Aspect of the Invention

The present disclosure relates in a first aspect of the invention to a dispensing station configured for dispensing lubricant to a target, comprising: a dispenser configured for dispensing the lubricant; a container removably placed in the dispensing station; a pump connected to the container and the dispenser; and a controller configured for controlling the pump. In a preferred embodiment, the dispensing station further comprises a data processing unit configured for communicating with the controller and configured for receiving one or more command parameter(s) via a first communication device. In most preferred embodiments, the first communication device is a wireless device, such as a tablet, a smart phone, a laptop, or a device configured with near field coupling or Bluetooth. In another preferred embodiment, the dispensing station is configured for receiving a first set of condition parameters via the first communication device, wherein the first condition parameters is related to at least the container. Most preferably, the dispensing station is further configured for receiving a second set of condition parameters via a second communication device, wherein the second set of condition parameter is related to at least the container. In some embodiments, the data processing unit is further configured for checking whether the first set of condition parameters matches the second set of condition parameters, such that: if the match is valid, the data processing unit is configured for allowing transmittance of said command parameter(s) to the controller, whereby lubricant is dispensed to the target, or if the match is invalid, the data processing unit is configured for denying transmittance of said command parameter(s) to the controller, whereby lubricant is not dispensed to the target.

The dispenser may be a hose, or a gun for dispensing the lubricant. In some embodiments, the dispenser is a gun connected to a hose.

According to the invention, the first communication device is used to send command parameters to the controller in either a mobile and/or one or more stationary dispensing station(s).

Also in accordance with the invention, a user is able to send both the control parameters and the first set of condition parameters to the data processing unit of the mobile or stationary dispensing station(s).

The present invention facilitates that the first communication device can send the first set of condition parameters to for example a plurality lubrication stations, which is in contrast to previously described lubricators. In other words, the present invention provides for easy configuration of either a mobile lubrication station and/or of one or more stationary lubrication stations.

It is an advantage of the present invention that the first communication device sends the control parameters.

It is another advantage of the present invention that the first communication device sends the first set of condition parameters.

It is a third advantage of the present invention that the dispensing station is easy to reconfigure in terms its condition parameters.

In particular, and according to the invention, the feature related to the first set of condition parameters, received at the data processing unit via the first communication device, is advantageous because it facilitates that a condition of one or more parts of the lubricator (at least the container) is easily defined or re-defined, namely via the first communication device.

In preferred embodiments, the second set of condition parameters is one or more of the following: type of lubricant in the container, density of lubricant in the container, viscosity of lubricant in the container, amount of lubricant in the container, and time(s) of use of the container.

According to the present invention, it is possible to easily define the first set of conditions parameters because the first communication device is wireless. Changing the first set of condition parameters can for example be done via the tablet or the smart phone.

As known, wireless devices can be equipped with passwords, and thus the invention does not compromise safety.

The present invention also provides a low cost dispensing station where a permanent memory does not need to be a part of the dispensing station. As a matter of fact, any of the communication devices according to the present invention do not need to have a permanent memory to provide a working dispensing station.

The second condition parameters may be measurable such as with sensor(s). The second condition parameters may in some embodiments be readable, and thus communicated to the data processing unit. Hence, in some embodiments, sensor(s) to measure operational properties may not be needed.

As to be understood from the disclosure, the present invention relates to a semi-automatic or automatic lubricator. This will be emphasized further in the present disclosure.

Typical lubricators as described can advantageously be modified such that instead of communicating with an internal and permanent memory and an internal data processing unit, existing sensor(s) can be re-configured to communicate with the data processing unit according to the invention. In this way, the output of existing sensor(s) in existing lubricators may be re-directed to the data processing unit according to the invention, whereto the first set of condition parameters is communicated.

Thereby is provided a way to provide a lubrication station, where the condition parameters are easily defined.

Furthermore, the present invention provides a lubrication station where the processing unit is a standardized part of the lubrication station.

Second Aspect

The present disclosure relates in a second aspect of the invention to a dispensing system, comprising: the dispensing station as described in the first aspect; the first communication device; and the second communication device.

Advantages of the dispensing system are the same as for the dispensing station.

DETAILED DESCRIPTION OF THE INVENTION

The present disclosure relates to a dispensing station and a dispensing system. The features of the dispensing station and the dispensing system are described in further details below.

First and Second Set of Condition Parameters and Command Parameter(s)

In one embodiment, the first set of condition parameters and/or the second set of condition parameters is/are one or more of the following: type of lubricant in the container, density of lubricant in the container, viscosity of lubricant in the container, amount of lubricant in the container, and time(s) of use of the container.

The present invention may not rely on build-in parameters in sensors, which is in contrast to previously described lubricators.

When the first set of condition parameters is received at the data processing unit, there might be a temporary memory, such as a cache, that stores the first set of condition parameters, and/or the second set of condition parameters, for example until the match according to the invention has been performed in relation to other set of condition parameters.

In a preferred embodiment, the command parameter(s) are selected from the group of: amount of the lubricant, flow rate of the lubricant, pressure of the pump, and speed of the pump. The amount of the lubricant may be in terms of a volume, for example, liters, mL, or in terms of a mass, for example kg, grams, or mg. The controller, or rather the data processing unit, may accordingly be programmed to respond to these units.

Second Communication Device

In one embodiment, the second communication device is a tag reader located in or on the dispensing station, wherein the tag reader is configured for reading a tag associated with the container.

In an alternative embodiment, the second communication device is a tag reader located remote from the dispensing station, wherein the tag reader is configured for reading a tag associated with the container.

The tag may be located in or on the container. The tag may however also be placed remote from the container.

In another embodiment, the second communication device is a scanning device configured for reading a label associated with the container. The label may be located in or on the container. The label may however also be placed remote from the container.

In a yet alternative embodiment, the second communication device is a manual input device configured for manually defining the second set of condition parameters.

In a preferred embodiment, the second communication device is different from the first communication device. However, in some embodiments, the first communication device and the second communication device is a single device.

In some embodiments, the second communication device is a wireless device such as a tablet, a smart phone, a laptop, or a device configured with near field coupling or Bluetooth. Preferably, the second communication device is configured for being mounted to a user of the dispensing station. This may allow for easy control of the dispensing station or at least for easy input to the controller. Thus, in some embodiments, the second communication device is configured to be mounted on the wrist of the user of the dispensing station. In this case, the second communication device may be a smart watch, or more generally, a remote control. In other embodiments, the second communication device is configured to be mounted on the arm of the user. In this case, the second communication device may be a smart phone or more generally, a remote control.

Data Processing Unit

In one embodiment, the data processing unit is further configured for: (a) receiving at least one request from the first communication device, wherein the request is for the data processing unit to identify at least some part of the dispensing station and (b) transmitting an answer back to the first communication device, where the answer indicates that the data processing unit has identified at least some part of the dispensing station.

The request from the first communication device may be automatic, for example once contact has been established such as with Bluetooth or near field coupling, or the request may be initiated by a user, for example by sending a message to the dispensing station.

The answer may be a message such as "yes", a number, or an ID code. The number or ID code may also be sent to a central database station via the first communication device. In this way, the user is able to go to the central data base station and for example see which dispensing station that is being used or has been used. The number or ID code may for example identify the dispensing station. The answer may also be along the lines of "Are you sure you want to connect to dispensing station number 42?" After receiving an answer in the form of a question, the user may return with an acceptable or a non-acceptance value via the first communication device.

The embodiment as described provides for additional safety.

In a preferred embodiment, the data processing unit is further configured for receiving: a third set of condition parameters via the first communication device, wherein the third set of condition parameters is related to the target, and a fourth set of condition parameters via a third communication device, wherein the fourth set of condition parameters is related to the target. This avoids further human errors.

In a most preferred embodiment, the data processing unit is further configured for checking whether the third set of condition parameters matches the fourth set of condition parameters, such that: if the match is valid, the data processing unit is configured for transmitting said command parameter(s) to the controller, whereby lubricant is dispensed to the target, or if the match is invalid, the data processing unit is configured for not transmitting said command parameter(s) to the controller, whereby lubricant is not dispensed to the target. Again, this avoids further human errors. For example, the embodiment provides for the dispensing station to only dispense, once the dispenser is very close to the target. If two or more targets are placed close to each other, and the two targets for example require different lubricants, the user holding the dispenser, does not need to worry about which target requires the one type of lubricant or another type of lubricant. The user may just place the dispenser close to the target.

The dispensing station dispenses then lubricant if the type of lubricant is correct.

In most embodiments, the data processing unit is configured for receiving said command parameters and said conditions via a receiver configured for communicating wirelessly with the first communication device. For example, if the first communication device is a mobile phone, the receiver may be a near field coupling receiver, a Bluetooth receiver, and/or an antenna configured for receiving signals via wireless internet or signal with frequencies as transmitted by mobile phones.

In one embodiment, the data processing unit is located in the dispensing station.

However, in other embodiments, the data processing unit is located remote from the dispensing station. For example, the data processing unit may be located in the first communication device or in a central database station.

In a preferred embodiment, the data processing unit is further configured for providing a status report based on how the pump is controlled. In other words, the data processing is configured for determining the output of the controller, wherein the output of the controller is defined as input to the pump.

In a most preferred embodiment, the data processing unit is further configured for transmitting the status report to the first communication device. For example, the status report may be an indication of whether the lubricant is dispensed or not. The status report may also be how much of lubricant was dispensed, what type of lubricant, the remaining amount of lubricant in the container, and/or what time the pump was used.

Third Communication Device

In one embodiment, the third communication device is a tag reader located in or on the dispenser, wherein the tag reader is configured for reading a tag associated with the target.

In an alternative embodiment, the third communication device is a scanning device configured for reading a label associated with the target.

In another alternative embodiment, the third communication device is a manual input device configured for manually defining the fourth set of condition parameters.

In yet another alternative embodiment, the third communication device is a wireless device such as a tablet, a smart phone, a laptop, or a device configured with near field coupling or Bluetooth.

Any of the third communication devices as described above provides for a lubrication station where human errors are limited.

Third and Fourth Set of Condition Parameters

In one embodiment, the third set of condition parameters and/or the fourth set of condition parameters is one or more of the following: type of a machine, type of a machine part, and location of a machine.

In another embodiment, the fourth set of condition parameters is provided by a positioning device, such as a global positioning system, wherein the positioning device is located in the dispensing station and/or the first communication device. Having a global positioning system, may allow that the coordinate set of the dispensing station and/or the first communication device is changed when for example the dispensing station is mobile and the user transports the dispensing station and/or the first communication device.

Dispensing Station in General

In a preferred embodiment, the dispensing station is mobile. This provides for a solution, where a single dispensing station can be used to dispense a plurality of targets instead of using for example a plurality of stationary dispensing stations, for example one per target.

However, in some embodiments, the dispensing station may be stationary. When using one or more stationary dispensing station(s), the user may not want to be nearby the dispensing station(s). Instead the user may be remotely placed from the dispensing station(s).

Lubricant

The lubricant as disclosed herein may in some embodiments comprise a tracer material. In this manner, the present invention may in some embodiments relate to a dispensing station for dispensing lubricant to a target, wherein the lubricant comprises the tracer material. Using a tracer material in the dispensing station may provide that the second set of condition parameters is able to be detected via a detector. That detector may be linked to the second communication device. The second condition parameters, related to the content of container, for example the type of the lubricant in the container, may then be transmitted via the second communication device to data processing unit.

Dispensing System and Communication Devices

In one embodiment, the dispensing system according to the second aspect of the invention further comprises the third communication device as disclosed in relation to the first aspect of the invention.

In a preferred embodiment, the first communication device is configured for logging the status as disclosed in relation to the first aspect of the invention.

In a more preferred embodiment, the dispensing system further comprises a central database station, configured for receiving the status report as just described. The status report is preferably transmitted from the first communication device.

In some embodiments, the dispensing system further comprises a central communication station, configured for transmitting said command parameter(s) and the first set of condition parameter(s) to the first communication device.

The second communication device and the third communication device that may be part of the dispensing system have been previously described in details.

In special embodiments, the first communication device is located in or on the target, for example in or on a machine. In this way, the one or more command parameter(s) are transmitted to the dispensing station from the target. This allows for a fully automatic setup.

Example 1

A Dispensing Station as Part of a Dispensing System

Figure 1:
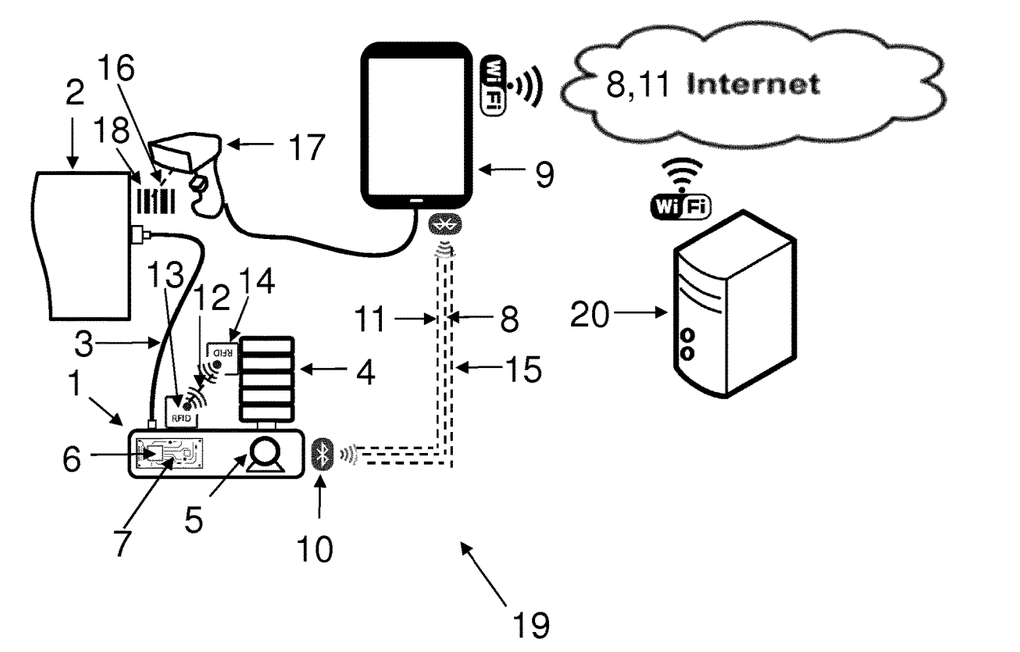
FIG. 1 shows an embodiment of the dispensing station as part of the dispensing system according to the invention.

FIG. 1 shows an embodiment of the dispensing station as part of the dispensing system according to the invention. An example of a dispensing station 1 according to the invention is shown in FIG. 1. As can be seen from the FIGURE, the dispensing station 1 is configured for dispensing lubricant to a target 2. A dispenser 3 is configured for dispensing the lubricant from the dispensing station 1 to the target 2. In this example, the dispenser 3 is a hose, connecting the dispensing station 1 to the target 3. Further, a container 4 is removably placed in the dispensing station 1. The dispensing station 1 further comprises a pump 5 and a controller 6 configured for controlling the pump 5.

The dispensing station further comprises a data processing unit 7 configured for communicating with the controller 6. In this example, the data processing unit 7 is located in the dispensing station, in particular integrated in the controller 6. In this manner, the command parameter(s) from the data processing unit is/are able to be transferred directly to the controller. However, although the data processing unit is integrated in the controller, the data processing unit is, as defined by the present invention, configured for allowing or denying that data in the form of command parameter(s) is transferred to the controller. In other words, the data processing unit is programmed to allow or deny whether the command parameter(s) are transferred to the controller from the processing unit, regardless of the data processing unit being an integrated part of the controller or not. A closed and/or integrated circuit is known to be programmed in various ways, and passing information or commands from one place to another is can be guided or not guided by various means. For example, a command (either in the form of analogue or digital signal) may be denied access to another place (such as to the controller) by letting the command circulate in a closed loop within the data processing unit. The data processing unit 7 is configured for receiving: one or more command parameter(s) 8 via a first communication device 9, wherein the first communication device 9 is a wireless device, in this example a smart phone configured with Bluetooth as also indicated in the FIGURE. As shown, the first communication device 9 communicates via Bluetooth, and thus the data processing unit 7 is configured for receiving said command(s) 8 via a Bluetooth receiver 10 configured for communicating wirelessly with the first communication device 9. The data processing unit 7 further receives a first set of condition parameters 11 via the first communication device 9, wherein the first condition parameters 11 is related to at least the container 4. The data processing unit 7 further receives a second set of condition parameters 12 via a second communication device 13, wherein the second set of condition parameter is related to at least the container 4. In this example, the second communication device 13 is a tag reader located in or on the dispensing station 1, wherein the tag reader is configured for reading a tag 14 associated with the container 4. The tag 14 as here shown is placed on the container 4. Although not to be seen from the FIGURE, the data processing unit 7 is further configured for checking whether the first set of condition parameters 11 matches the second set of condition parameters 12, such that: if the match is valid, the data processing unit 7 is configured for transmitting said command parameter(s) 8 to the controller 6, whereby lubricant is dispensed to the target 2, or if the match is invalid, the data processing unit 7 is configured for not transmitting said command parameter(s) 8 to the controller, whereby lubricant is not dispensed to the target 2. In this example, there is provided a system that is optimized for preventing human errors. In order to do so, the data processing unit 7 is further configured for receiving a third set of condition parameters 15 via the first communication device, wherein the third set of condition parameters 15 is related to the target 2, and a fourth set of condition parameters 16 via a third communication device 17, wherein the fourth set of condition parameters is related to the target 2. In this example, the third communication device is a scanning device, in particular a bar code reader, configured for reading a label 18, i.e. a bar code, associated with the target 2.

As seen from FIG. 1, there is a dispensing system 19, comprising the dispensing station 1, the first communication device 9 and the second communication device 13.

The dispensing system 19 further comprises a central communication station 20, configured for transmitting said command parameter(s) 8 and the first set of condition parameter(s) 11 to the first communication device 9.

Example 2

Semi-Automatic Mode of a Mobile Dispensing Station

If a user desires that the dispensing station only dispenses lubricant when a desired type of lubricant is present in the dispensing station, i.e. in the container, the first set of condition parameters is set to a type of lubricant.

The type of lubricant is specified in the first communication device, from which the type of lubricant is transferred to the data processing unit. The user easily configures the dispensing station using the first communication device, for example using a tablet that is wirelessly connected to the data processing unit. However, it may not need to be the user that configures the dispensing station. It may be automatically set up, or pre-set by another user and/or engineer, however using the first communication device.

At this stage, the dispensing station may not yet know what type of lubricant is present in the dispensing station, and accordingly, it is not yet able to dispense lubricant.

Upon informing the dispensing station that the dispensing station has a container with the desired type of lubricant, the dispensing station is able to dispense the lubricant.

Accordingly, the user looks at the container in the dispensing station, and sees that a label reads "grease A". The user manually inputs this as the second set of condition parameters via the second communication device, in this case a manual input device, for example located on the dispensing station. Because the user correctly reads the label and inputs it correctly, the dispensing station is able to dispense the lubricant.

The user now desires that the dispensing station dispenses 0.2 L of lubricant to a given machine part. Accordingly the user set one command parameter to the amount of 0.2 L of the lubricant using the tablet and the tablet transmits this to the data processing unit. Hereafter, the lubricant is dispensed to the target.

This example shows that the user or another user has to configure the dispensing station with the first set of condition parameters. The user has to input the second set of condition parameters, and finally provide the dispensing station with a command parameter. In other words, the user is forced to perform at least two steps in order to dispense the lubricant. This example shows that a user cannot just dispense lubricant as desired without being checked. The dispensing station is configured for at least double checking that the user really wants to dispense the lubricant. However, the example also shows that the second communication device is able to work as a remote control of the dispensing station.

Further, this example shows that the first set of condition parameters and the one or more command parameter(s) need not to be received at the same time. However, in some embodiments, the first set of condition parameters and the one or more command parameter(s) could be received at the same time, for example and in relation to the present example, if the first communication device is configured for storing the first set of condition parameters, for example in a temporary memory in the first communication device, or alternatively or additionally on a hard drive or server in wireless communication with the first communication device, or if the data processing unit is configured for storing the first set of condition parameters, for example in a temporary memory.

Example 3

Semi-Automatic Mode of a Mobile Dispensing Station

If a manager desires that the dispensing station only dispenses lubricant when a desired type of lubricant is present in the dispensing station, i.e. in the container, the first set of condition parameters is set to the type of lubricant. In this example, the manager is not the user, and the manager wants to limit user errors.

Accordingly, the manager instructs an engineer at a central communication station that the dispensing station needs to be set up as desired. The engineer transmits the first set of condition parameter(s) as the type of lubricant to the to the first communication device, for example a smart phone.

The user of the dispensing station takes a mobile dispensing station along with the first communication device. When the dispensing station and the first communication device are in close proximity to each other, the first set of condition parameters is transmitted to the data processing unit.

In case, the user brings the mobile dispensing station to a ware hall of containers and wrongfully places a container with a type of lubricant that does not match the type of lubricant as set by the engineer, the following happens. A tag inside the container is read by a tag reader in the dispensing station. The tag comprises the type of lubricant and the tag reader transmits accordingly which type of lubricant is in the container to the data processing unit. The user transports the dispensing station to the target, and using the first communication device, the user transmits that 0.2 L of lubricant is to be dispensed from the dispensing station. According to the present invention, the lubrication station does not dispense lubricant to the target, because the type of lubricant as communicated by the tag reader does not match the type of lubricant as specified by the engineer. The first communication device receives a status report, wherefrom the user is able to read that the lubricant is not the correct type.

The user therefore places the container with the correct container, transmits that 0.2 L of lubricant is to be dispensed from the dispensing station. Because there is a match between the two parameters, the dispensing station dispenses the lubricant.

In this example, it is evident that the data processing unit is further configured for providing a status report based on how the pump is controlled, and configured for transmitting the status report to the first communication device.

Accordingly, a status report is transmitted to the first communication device, stating that 0.2 L of lubricant is dispensed. Further information may be that this is dispensed from a dispenser identified as number 42.

Further, the first communication device is configured for logging the status report. Thus the user is able to access the first communication device at any time, and see how the dispensing station, for example number 42, was operated.

In this example, there is further a central database station, configured for receiving the status report from the first communication device. The first communication device either sends the status report via wirelessly, for example via WIFI, to the central database station or alternatively, the first communication device sends the status report via a wired connection, for example, once the first communication device is placed in a charging device.

Monitoring of the dispensing stations may accordingly be done by accessing the central database station. Maintenance of the dispensing stations may accordingly also be possible by extracting data from the central database station.

This example shows that the first set of condition parameters and the one or more command parameter(s) need not to be received at the same time. However, in some embodiments, the first set of condition parameters and the one or more command parameter(s) could be received at the same time, for example and in relation to the present example, if the first communication device is configured for storing the first set of condition parameters, for example in a temporary memory in the first communication device, or alternatively or additionally on a hard drive or server in wireless communication with the first communication device, or if the data processing unit is configured for storing the first set of condition parameters, for example in a temporary memory.

Example 4

Semi-Automatic Mode of a Mobile Dispensing Station

If a manager desires that the dispensing station only dispenses lubricant when a desired type of lubricant is present in the dispensing station, i.e. in the container, the first set of condition parameters is set to the type of lubricant. In this example, the manager is not the user, and the manager does not want to rely on user factors.

Accordingly, the manager instructs an engineer at a central communication station that the dispensing station needs to be set up as desired. The engineer transmits the first set of condition parameter(s) as the type of lubricant to the to the first communication device, for example a smart phone.

The user places the container with the correct container, and transmits that the 0.2 L of lubricant is to be dispensed from the dispensing station. Because there is a match between the two parameters, the dispensing station is able to dispense the lubricant. However nothing is dispensed at this stage.

The reason is that the data processing unit is further configured for receiving a third set of condition parameters via the first communication device, wherein the third set of condition parameters is related to the target, and a fourth set of condition parameters via a third communication device, wherein the fourth set of condition parameters is related to the target.

Even further, the data processing unit is configured for checking whether the third set of condition parameters matches the fourth set of condition parameters, such that: if the match is valid, the data processing unit is configured for allowing transmittance of said command parameter(s) to the controller, whereby lubricant is dispensed to the target, or if the match is invalid, the data processing unit is configured for denying transmittance of said command parameter(s) to the controller, whereby lubricant is not dispensed to the target.

The engineer therefore transmitted the third set of condition parameter(s) with the first set of condition parameters to the first communication device. The third set of condition parameters was set to a machine part.

The user holds the dispenser and places the dispenser close to a specific machine part. In this example, the third communication device is a tag reader located in or on the dispenser, and the tag reader is configured for reading a tag associated with the target. The tag comprises the fourth set of condition parameters, in this case, a machine part.

Because the user holds the dispenser very close to the machine part, the tag is read by the tag reader. Accordingly, the data processing unit receives the fourth set of condition parameters and performs a match between the third set and fourth set of condition parameters. Hereafter, the dispensing station is able to dispense the lubricant.

The user transmits again that the 0.2 L of lubricant is to be dispensed from the dispensing station. Because there is now a match between the third and fourth set of condition parameters, the dispensing station dispenses the lubricant.

The example shows that the user can operate the dispensing station and because the user places the dispenser to the machine part as specified and uses the correct type of lubricant, the user is allowed to dispense the lubricant.

Further, the example shows that the first set of condition parameters and the one or more command parameter(s) need not to be received at the same time. However, in some embodiments, the first set of condition parameters and the one or more command parameter(s) could be received at the same time, for example and in relation to the present example, if the first communication device is configured for storing the first set of condition parameters, for example in a temporary memory in the first communication device, or alternatively or additionally on a hard drive or server in wireless communication with the first communication device, or if the data processing unit is configured for storing the first set of condition parameters, for example in a temporary memory.

Further details of the invention are described by the following items.

Items

1. A dispensing station configured for dispensing lubricant to a target, comprising:
   a dispenser configured for dispensing the lubricant;
   a container removably placed inside the dispensing station;
   a pump connected to the container and the dispenser;
   a controller configured for controlling the pump,
   a data processing unit configured for communicating with the controller and configured for receiving:
      one or more command parameter(s) via a first communication device, wherein the first communication device is a wireless device, such as a tablet, a smart phone, a laptop, or a device configured with near field coupling or Bluetooth,
      a first set of condition parameters via the first communication device, wherein the first condition parameters is related to at least the container;
      a second set of condition parameters via a second communication device, wherein the second set of condition parameter is related to at least the container; and
   wherein the data processing unit is further configured for checking whether the first set of condition parameters matches the second set of condition parameters, such that:
      if the match is valid, the data processing unit is configured for transmitting said command parameter(s) to the controller, whereby lubricant is dispensed to the target, or
      if the match is invalid, the data processing unit is configured for not transmitting said command parameter(s) to the controller, whereby lubricant is not dispensed to the target.

2. The dispensing station according to item 1, wherein the first set of condition parameters and/or the second set of condition parameters is/are one or more of the following: type of lubricant in the container, density of lubricant in the container, viscosity of lubricant in the container, amount of lubricant in the container, and time(s) of use of the container.

3. The dispensing station according to any of the preceding items, wherein said command parameter(s) is/are selected from the group of: amount of the lubricant, flow rate of the lubricant, pressure of the pump, and speed of the pump.
4. The dispensing station according to any of the preceding items, wherein the second communication device is a tag reader located in or on the dispensing station, wherein the tag reader is configured for reading a tag associated with the container.
5. The dispensing station according to any of the preceding items, wherein the second communication device is a tag reader located remote from the dispensing station, wherein the tag reader is configured for reading a tag associated with the container.
6. The dispensing station according to any of the preceding items, wherein the second communication device is a scanning device configured for reading a label associated with the container.
7. The dispensing station according to any of the preceding items, wherein the second communication device is a manual input device configured for manually defining the second set of condition parameters.
8. The dispensing station according to any of the preceding items, wherein the data processing unit is further configured for:
    receiving at least one request from the first communication device, wherein the request is for the data processing unit to identify at least some part of the dispensing station,
    transmitting an answer back to the first communication device, where the answer indicates that the data processing unit has identified at least some part of the dispensing station.
9. The dispensing station according to any of the preceding items, wherein the data processing unit is further configured for receiving:
    a third set of condition parameters via the first communication device, wherein the third set of condition parameters is related to the target, and
    a fourth set of condition parameters via a third communication device, wherein the fourth set of condition parameters is related to the target.
10. The dispensing station according item 9, wherein the data processing unit is further configured for checking whether the third set of condition parameters matches the fourth set of condition parameters, such that:
    if the match is valid, the data processing unit is configured for transmitting said command parameter(s) to the controller, whereby lubricant is dispensed to the target, or
    if the match is invalid, the data processing unit is configured for not transmitting said command parameter(s) to the controller, whereby lubricant is not dispensed to the target.
11. The dispensing station according to any of the items 9-10, wherein the third communication device is a tag reader located in or on the dispenser, wherein the tag reader is configured for reading a tag associated with the target.
12. The dispensing station according to any of the items 9-10, wherein the third communication device is a scanning device configured for reading a label associated with the target.
13. The dispensing station according to any of the items 9-10, wherein the third communication device is a manual input device configured for manually defining the fourth set of condition parameters.
14. The dispensing station according to any of the items 9-10, wherein the third set of condition parameters and/or the fourth set of condition parameters is one or more of the following: type of a machine, type of a machine part, and location of a machine.
15. The dispensing station according to item 14, wherein the fourth set of condition parameters is provided by a positioning device, such as a global positioning system, wherein the positioning device is located in the dispensing station and/or the first communication device.
16. The dispensing station according any of the preceding items, wherein the second communication device and/or the third communication device is a wireless device such as a tablet, a smart phone, a laptop, or a device configured with near field coupling or Bluetooth.
17. The dispensing station according any of the preceding items, wherein the second communication device is different from the first communication device.
18. The dispensing station according to any of the preceding items, wherein the data processing unit is configured for receiving said command(s) and the first set of condition parameters via a receiver configured for communicating wirelessly with the first communication device.
19. The dispensing station according to any of the preceding items, wherein the data processing unit is located in the dispensing station.
20. The dispensing station according to any of the preceding items, wherein the data processing unit is located remote from the dispensing station.
21. The dispensing station according to any of the preceding items, wherein the data processing unit is located in the first communication device.
22. The dispensing station according to any of the preceding items, wherein the data processing unit is further configured for providing a status report based on how the pump is controlled.
23. The dispensing station according to any of the preceding items, wherein the data processing unit is further configured for transmitting the status report to the first communication device.
24. The dispensing station according to any of the preceding items, wherein the dispensing station is mobile.
25. A dispensing system, comprising:
    the dispensing station according to any of the items 1-24;
    the first communication device; and
    the second communication device.
26. The dispensing system according to item 25 further comprising the dispensing station according to item 1 and 9 and the third communication device.
27. The dispensing system according to any of the items 25-26, wherein the first communication device is configured for logging the status report according to item 22.
28. The dispensing system according to any of the items 25-27, further comprising a central database station, configured for receiving the status report according to item 22 from the first communication device.
29. The dispensing system according to any of the items 25-28, further comprising a central communication station, configured for transmitting said command parameter(s) and the first set of condition parameter(s) to the first communication device.
30. The dispensing system according to any of the items 25-29, further comprising the target, wherein the target is a machine or a part of the machine.
31. The dispensing system according to any of the items 25-30, wherein the second communication device is according to any of the items 4-7 and 16.

32. The dispensing system according to any of the items 25-31, wherein the third communication device is according to any of the items 11-13 and 16.
33. The dispensing system according to any of the items 25-32, wherein the first communication device is located in or on the target.

The invention claimed is:

1. A dispensing station configured for dispensing lubricant to a target, comprising:
   a dispenser configured for dispensing the lubricant;
   a container removably placed in the dispensing station;
   a pump connected to the container and the dispenser;
   a controller configured for controlling the pump;
   a data processing unit configured for communicating with the controller and configured for receiving:
      one or more command parameter(s) via a first communication device, wherein the first communication device is a wireless device, such as a tablet, a smart phone, a laptop, or a device configured with near field coupling or Bluetooth,
      a first set of condition parameters via the first communication device, wherein the first condition parameters is related to at least the content of the container,
      a second set of condition parameters via a second communication device, wherein the second set of condition parameter is related to at least the content of the container; and
   wherein the data processing unit is further configured for checking whether the first set of condition parameters matches the second set of condition parameters, such that:
      if the match is valid, the data processing unit is configured for allowing transmittance of said command parameter(s) to the controller, whereby lubricant is dispensed to the target, or
      if the match is invalid, the data processing unit is configured for denying transmittance of said command parameter(s) to the controller, whereby lubricant is not dispensed to the target.

2. The dispensing station according to claim 1, wherein the first set of condition parameters and/or the second set of condition parameters is/are one or more of the following: type of lubricant in the container, density of lubricant in the container, viscosity of lubricant in the container, amount of lubricant in the container, and time(s) of use of the container.

3. The dispensing station according to claim 1, wherein the second communication device is a tag reader located in or on the dispensing station, wherein the tag reader is configured for reading a tag associated with the container.

4. The dispensing station according to claim 1, wherein the data processing unit is further configured for:
   receiving at least one request from the first communication device, wherein the request is for the data processing unit to identify at least some part of the dispensing station, and
   transmitting an answer back to the first communication device, where the answer indicates that the data processing unit has identified at least some part of the dispensing station.

5. The dispensing station according to claim 1, wherein the data processing unit is further configured for receiving:
   a third set of condition parameters via the first communication device, wherein the third set of condition parameters is related to the target, and
   a fourth set of condition parameters via a third communication device, wherein the fourth set of condition parameters is related to the target.

6. The dispensing station according claim 5, wherein the data processing unit is further configured for checking whether the third set of condition parameters matches the fourth set of condition parameters, such that:
   if the match is valid, the data processing unit is configured for allowing transmittance of said command parameter(s) to the controller, whereby lubricant is dispensed to the target, or
   if the match is invalid, the data processing unit is configured for denying transmittance of said command parameter(s) to the controller, whereby lubricant is not dispensed to the target.

7. The dispensing station according to claim 5, wherein the third communication device is a tag reader located in or on the dispenser, wherein the tag reader is configured for reading a tag associated with the target.

8. The dispensing station according to claim 5, wherein the third set of condition parameters and/or the fourth set of condition parameters is one or more of the following: type of a machine, type of a machine part, and location of a machine.

9. The dispensing station according to claim 8, wherein the fourth set of condition parameters is provided by a positioning device, such as a global positioning system, wherein the positioning device is located in the dispensing station and/or the first communication device.

10. The dispensing station according to claim 1, wherein the data processing unit is located in the first communication device.

11. The dispensing station according to claim 1, wherein the data processing unit is further configured for providing a status report based on how the pump is controlled.

12. The dispensing station according to claim 11, wherein the data processing unit is further configured for transmitting the status report to the first communication device.

13. A dispensing system, comprising:
   the dispensing station according to claim 1;
   the first communication device; and
   the second communication device.

14. The dispensing system according to claim 13, wherein the first communication device is configured for logging a status report based on how the pump is controlled.

15. The dispensing system according to claim 13, further comprising a central communication station, configured for transmitting said command parameter(s) and the first set of condition parameter(s) to the first communication device.

* * * * *